(12) United States Patent
Sharp et al.

(10) Patent No.: US 7,436,476 B2
(45) Date of Patent: Oct. 14, 2008

(54) HIGH DURABILITY AND HIGH PERFORMANCE POLARIZATION OPTICS USING A LOW-ELASTICITY ORGANIC LAYER

(75) Inventors: Gary D. Sharp, Boulder, CO (US); Michael G. Robinson, Boulder, CO (US); Jianmin Chen, Superior, CO (US)

(73) Assignee: Real D, Beverly Hills, CA (US)

( * ) Notice: Subject to any disclaimer, the term of this patent is extended or adjusted under 35 U.S.C. 154(b) by 142 days.

(21) Appl. No.: 10/908,740

(22) Filed: May 24, 2005

(65) Prior Publication Data

US 2005/0259205 A1 Nov. 24, 2005

Related U.S. Application Data

(60) Provisional application No. 60/573,910, filed on May 24, 2004.

(51) Int. Cl.
*G02F 1/1335* (2006.01)

(52) U.S. Cl. .......................... 349/117; 349/5; 349/118; 349/119; 349/121; 349/129; 428/1.3; 428/1.5; 428/1.55; 428/441; 428/442

(58) Field of Classification Search .............. 349/5, 349/117, 118, 119, 121; 428/1.3, 1.5, 1.55, 428/441, 442
See application file for complete search history.

(56) References Cited

U.S. PATENT DOCUMENTS

| | | | |
|---|---|---|---|
| 4,536,063 A | 8/1985 | Southwell | |
| 5,320,893 A | 6/1994 | Floyd | |
| 5,472,538 A | 12/1995 | Minakuchi et al. | |
| 5,571,567 A | 11/1996 | Shah | |
| 5,751,384 A | 5/1998 | Sharp | |
| 5,888,603 A | 3/1999 | Fergason | |
| 5,990,996 A | 11/1999 | Sharp | |
| 6,004,417 A | 12/1999 | Roesch et al. | |
| 6,025,958 A | 2/2000 | Yamaoka et al. | |
| 6,078,370 A * | 6/2000 | Wang et al. | 349/75 |
| 6,096,375 A | 8/2000 | Ouderkirk et al. | |
| 6,156,433 A | 12/2000 | Hatori et al. | |
| 6,362,862 B1 | 3/2002 | Itoh et al. | |
| 6,552,767 B1 | 4/2003 | Kaneko | |
| 6,603,523 B2 | 8/2003 | Nakamura et al. | |
| 6,667,784 B2 | 12/2003 | Sharp et al. | |
| 2002/0018883 A1 | 2/2002 | Okazaki et al. | |
| 2003/0147015 A1 | 8/2003 | Katoh et al. | |

FOREIGN PATENT DOCUMENTS

WO WO 00/07172 2/2000

OTHER PUBLICATIONS

International Search Report for co-pending PCT Application PCT/IB05/51683, mailed Mar. 23, 2006.
Notification of Transmittal of the International Search Report and the Written Opinion of the International Searching Authority or the Declaration; from corresponding PCT Application PCT/IB05/51662; Applicant ColorLink, Inc. mailed Nov. 30, 2006 from ISA/US.

* cited by examiner

*Primary Examiner*—D. S Nakarani
(74) *Attorney, Agent, or Firm*—Baker & McKenzie LLP

(57) ABSTRACT

Described is an optical compensator device that can maintain a high degree of performance in the demanding environment of projection display. A mounting process involves using a sealant between optically clear glass or ceramic substrate and low elastic polymer retarder film. The sealant may mitigate or prevent the degradation of the retarder film by acting as an oxygen barrier that seals the substrate and increases the lifetime of the device in high luminance.

25 Claims, 1 Drawing Sheet

HIGH DURABILITY AND HIGH PERFORMANCE POLARIZATION OPTICS USING A LOW-ELASTICITY ORGANIC LAYER

CROSS-REFERENCE TO PRIOR APPLICATIONS

This application claims priority to U.S. provisional patent application No. 60/573,910, filed May 24, 2004 entitled "High Durability and High Performance Polarization Optics Using a Low Elasticity Organic Substrate."

TECHNICAL FIELD

Disclosed embodiments herein relate generally to optical devices for use in display systems, and more particularly to high durability, high performance polarization optics employing a low elasticity organic substrate.

BACKGROUND

In projection displays using liquid crystal on silicon (LCoS) panels, there are usually opportunities for improving performance using compensating retarders. These compensators can be used to remove residual in-plane retardance of the panel in the black state, and/or for removing light leakage due to the finite field of view of the liquid crystal layer. Moreover, compensators can nullify leakage associated with geometrical rotation from McNeille polarizing beamsplitters (PBS) in finite f-number systems. They can also compensate for polarization distortion induced by wire grid polarizers (WGP) in certain systems, particularly those that are off-telecentric. In an actual system, two or three of these coupled effects can be compensated using a compound element that resides in the space between the PBS and the LCoS panel.

Such compound elements have been shown to accomplish the desired compensation via computer modeling, but practical demonstrations frequently fall significantly short of theoretical predictions. In practice, this is the result of subtle compensator deficiencies that often determine the final system contrast.

Stretched polymer retarder films are frequently used, for instance, in circular polarizers to reduce glare in direct view displays. Early retarder films were manufactured using polyvinyl alcohol (PVA)—a substrate mass-manufactured to produce polarizing films. But PVA substrates are thin and hygroscopic, thus possibly necessitating the additional lamination of a support substrate with a moisture barrier function, such as cellulose acetate butyrate. Much of the PVA based product available today is not suitable for contemporary retarder film applications, due to excessive thickness and poor uniformity.

Much of the more recent development work in manufacturing retarder films was for standard twisted nematic (STN) panel compensation and for field-of-view compensation in direct view active matrix LCD (AMLCD) displays. Polycarbonate has emerged as the substrate of choice for LCD applications. In direct-view LCD displays, stretched polycarbonate films are attached to the LCD polarizers using pressure sensitive adhesive (PSA).

In principle, retarder films for projection can also be manufactured using polycarbonate materials that are similar to those used for direct-view LCD compensator applications. The performance and reliability requirements of projection compensators rule out many of the commercially available retarder film products. Compensator retarder films for projection would optimally balance properties such as high optical clarity, low defect density, low refractive index (1.52) for index matching to glass to minimize isotropic reflections, low birefringence to minimize anisotropic reflections, uniform casting or extrusion to minimize transmitted wavefront distortion and birefringence texture, uniformity of optic axis and retardance, low surface energy for adhesive bonding, high rigidity to resist non-uniformities resulting from mechanical strain, and performance stability. These properties should be maintained despite the temperature cycling and high luminance that the materials face in the projection environment.

Polycarbonate materials have a relatively high refractive index (1.59), but they have been manufactured to otherwise meet many of the above challenges posed in the projection environment. The properties of polycarbonate materials are nonetheless significantly challenged under the high-heat, high-luminance conditions of the projection environment.

One issue related to using polymer retarder films in projection systems relates to thermal gradients that develop under the intense illumination conditions. Nonuniform heating in a typical float glass compensator can induce stress birefringence that is directly observable in a crossed polarizer light box where it is manifested as, for example, a corner light leakage. In some instances, the temperature gradients are sufficient in the LCoS panel port of a projector that dark state uniformity is not adequate. To minimize this effect, glass with low photoelastic coefficient is selected or the overall thickness of glass is minimized. But even in such systems, mechanical strain can develop between the glass substrate and the optical bonding/sealant layers.

To further reduce this strain, low durometer elastomeric sealants with adhesive properties have been used to bond the retarder film layer to the glass substrate. Such elastomeric adhesives mechanically isolate the retarder film from the glass substrate. But when more rigid sealants are used with typical polycarbonate, the temperature window of operation is too narrow for projection systems.

Typical pressure sensitive adhesives that are frequently used for mounting polarizer to glass in high temperature polysilicon (HTPS) projection systems degrade under the intense illumination of higher brightness systems, such as an LCoS projector. Moreover, pressure sensitive adhesives typically have a low refractive index (1.46), giving high reflections that can reduce contrast in LCoS systems. Also, the haze from pressure sensitive adhesives contributes an additional scatter component that can reduce sequential and ANSI contrast.

There are alternatives to pressure sensitive adhesives for mounting retarder film to a rigid substrate. Ultraviolet cure acrylic sealants can be extremely clear and can have an intermediate refractive index. When carefully cured, the strain on the retarder film can be minimized. But such acrylic sealants usually have a poor coefficient of thermal expansion (CTE) match to the substrate, which results in a mechanical load when the temperature deviates from the cure temperature. In applications involving severe temperature cycling, delamination due to the CTE mismatch can ultimately occur.

Thus, improved compensators would be useful, especially in high intensity projection systems.

SUMMARY

In one aspect, embodiments of the invention provide a compensating component that accomplishes near-theoretical performance while further maintaining a high degree of performance, such as, for example, achieving an optic axis stability of $<\pm0.1°$, and retardance stability of $<\pm0.5$ nm, over the part area and under all of the specified operating conditions in the demanding environment of projection display. In some instances, this may mean that a significant contrast loss is experienced unless the optic axis and retardance are maintained to this degree. The core component of these compensating components is a retarder film or organic layer. The functionality of this core component may be one of polarization rotation, polarization retardation, and wavelength-selective polarization rotation and/or retardation.

Some embodiments of the invention provide an optical compensating component having an environmental seal. In some embodiments, the environmental seal is achieved by a mounting process that allows light to pass through the sealant and glass boundary layers. The environmental seal protects the retarder films from environmental exposure, and specifically oxygen, which is particularly important with disclosed low-elasticity organic materials under high-temperature, high-luminance conditions. Alternatively, or in addition, an edge seal may be used between glass substrates to restrict the passage of oxygen to the retarder film. Some optical components fabricated according to the present invention show a dramatic improvement in reliability. Testing shows that some such optical components can survive in a 190 Mlux environment for at least 3000 hours, with an optic axis stability of <±0.1° and retardance stability of <±0.5 nm, over the part area and under specified operating conditions in the demanding environment, although the claimed invention is not to be constrained in any way by this measured result unless specifically claimed as such. The described embodiments can accordingly be useful in environments of higher or lower light intensity in which the components survive for a lesser or greater time. For example, it is also advantageous that the described optical components formed according to the principles described herein could perform with the described optic axis and retardance stability when operating in 50 Mlux or 100 Mlux environments for at least approximately 3000 hours.

In one embodiment, such an optical component includes a first substrate layer having a first barrier layer formed on it; a low-elasticity, molecularly aligned layer formed over the first barrier layer; a second barrier layer formed over the molecularly aligned layer; and a second substrate layer formed over the second barrier layer. The formed optical component comprises an environmental seal that environmentally isolates the retarder film.

Additional barrier layers formed upon the substrate or substrates, and those additional barrier layers may provide additional sealing against the environment surrounding the optical component, stiffening the substrate, making the substrate less reflective to incident light-acting as a antireflective coating, and improving the optical characteristics of light passing through the optical component.

A specific embodiment of such an optical component is a polarization optic wherein: the substrates comprise an optically clear glass or ceramic; the low-elasticity, molecularly aligned layer comprises a stretched-polymer retarder film; and the barrier layers, which are located between the substrate layers and the retarder film, comprise optically clear sealant layers that provide an oxygen barrier between the substrate and the film. The substrate or substrates may comprise fused silica, boro-float glass, ceramic glass, optically clear glass, or a low birefringence polymer. The sealing element/barrier layers may be optically clear sealants, acrylic sealants, or ultraviolet cured acrylic sealants, or they may be additional organic or inorganic layers that are welded to the retarder film, such as through solvent welding.

The low-elasticity, molecularly aligned layer may comprise a single-layer retarder film using modified polyolefin, such as Arton.® The molecularly aligned layer may be biaxially stretched along an X-Y coordinate system, for example, 10-25 nm in-plane retardance and/or 120-250 nm of negative z retardance. The molecularly aligned layer may be one or multiple layers, and may comprise crossed uniaxial substrates (crossed a-plates) of low-elasticity materials that are laminated together to behave collectively as a c-plate in specific planes. The molecularly aligned layer may also be a multi-layer stack element. In such embodiments, the retarder film may be laminated using chemical bonding, such as with methyl amyl ketone (MAK) or methyl ethyl ketone (MEK). This lamination technique is further described in U.S. Pat. No. 6,638,583, which is hereby incorporated by reference herein. The described lamination technique can be used not only for laminating multiple layers of a multi-layer stack, but can also be used in bonding any of the substrate layers, the barrier layers, and the molecularly aligned layers to each other to the extent the relative materials used are amenable to the described techniques.

Compound multi-layer elements, comprising molecularly aligned layers which can form achromatic circular polarizers, achromatic polarization rotators, achromatic half-wave and achromatic quarter-wave compensators may also be employed in accordance with the principles disclosed herein. The embodiments of the optical components made in accordance with described embodiments have the potential to perform extremely well over a very broad wavelength range. The particular examples described above are components that have polarization effects on light passing through the optical components, whereas elements such as the surrounding adhesives, barrier layers, and/or substrates would typically have unaligned molecules that would not have polarization effects.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION OF THE PREFERRED EMBODIMENTS

Optical projection systems experience intense illumination, which can induce non-uniform heating in the optical components of the systems. The heating must be accounted for in the design of those projection systems and their components. Certain optical components are designed from a stack of optical elements or optical materials. A particular application of interest is the use of a retarder film optical compensator, or more generally the use of an organic material layer, that is sandwiched between opposing glass substrates, with or without barrier layers separating the retarder film or organic material layer from the opposing glass substrates. The strains that can be placed upon the retarder stacks by nonuniform heating of the glass substrates and nonuniform heating of the overall stack of optical materials, however, can cause stress birefringence or other optical performance variations across the dimensions of the stacked optical component.

These optical effects can particularly be induced by varying strains placed on the glass-polymer bond across the dimensions of an organic layer or retarder stack as it is bonded to the glass substrates.

Embodiments of the invention provide an optical component in which the effects of stress birefringence or other optical performance variations due to nonuniform heating are reduced. In some embodiments, the optical component is a compensator that includes first and second glass (or optical substrate) layers having a low-elasticity, molecularly aligned organic layer sandwiched or interposed between them. The embodiments may include barrier layers between the glass layers and the molecularly aligned layer.

Figure 1:
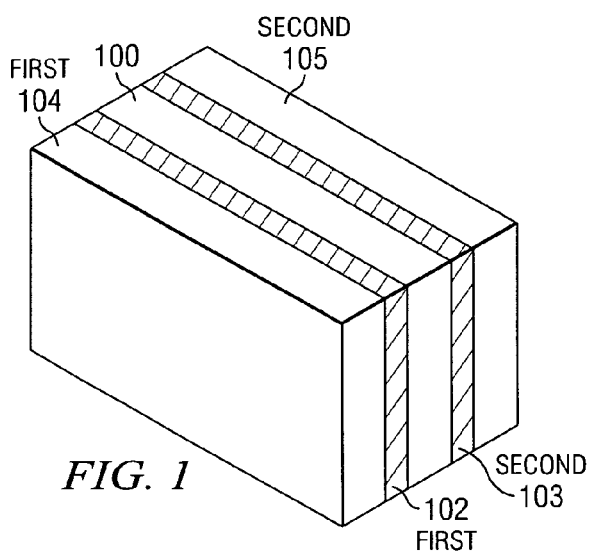
FIG. 1 illustrates one embodiment of a compensator device constructed in accordance with the disclosed principles.

As illustrated in FIG. 1, embodiments of the compensating component may also include substrate layers 104, 105. The substrate layers 104, 105 may be the same or different materials, and specifically the materials may be optically clear glass or ceramic glass. Some suitable glass materials include glasses with low photo-elastic coefficient. Such glasses include, but are not limited to, fused silica and ceramic glass, such as Neoceram.® If lower cost boro-float glasses are used, they can be designed to be less than 0.3 mm thick, to minimize the magnitude of stress birefringence. Another possible substrate material would be low birefringence polymers. Where the substrate is a polymer substrate, it would likely be a design approach for the polymer substrate to be aligned to have a stretching direction that is aligned with or orthogonal to the polarization direction of an input light.

Specifically, FIG. 1 illustrates an embodiment in which first and second glass (or optical substrate) layers 104, 105 have a low-elasticity, molecularly aligned organic layer 100 sandwiched or interposed between them. The embodiments may include barrier layers 102, 103 between the glass layers 104, 105 and the molecularly aligned layer, such as a retarder film 100. Barrier layers 102, 103 are typically optically clear sealants, such as acrylic-based formulations, which may be thermally or UV cured. The barrier layers 102, 103 may be selected and designed to act as an oxygen barrier, substantially isolating the molecularly aligned layer 100 from its environments, thereby reducing the degradation of the layer 100 due to photochemical or other reactions. Specifically, such sealing can significantly thwart processes, such as a free-radical activation, that can otherwise occur. In some embodiments, the barrier layers 102, 103 themselves may comprise two or more layers. The first and second optical substrate layers 104, 105 may be the same or different materials, and the first and second barrier layers 102, 103 may also be the same or different materials.

The oxygen barrier function can additionally be provided by vacuum or wet coating of barrier layers onto the film prior to mounting. Such coatings can provide the functional environmental seal, decoupling this from the mechanical and optical requirements of a mounting adhesive.

In the described embodiments, the retarder film layer 100 is an organic material, such as a polymer, particularly a polyolefin-based material, that maintains the as-stretched film properties resulting from the mounting process and withstands thermal cycling characteristic of projection environments. In an embodiment of the invention, the retarder film 100 is a modified (e.g. cyclic-olefin-copolymer) polyolefin that has suitable optical properties and relative insensitivity to tensile and/or shear stress. Birefringence shift and optic axis rotation due to applied stress is much larger in polycarbonate (e.g. Nitto Denko NRF) film, than in these substrates. One such modified polyolefin is Arton®, manufactured by JSR Corporation of Tokyo, Japan. Similar polyolefins are also manufactured by Nippon Zeon and Mitsui Chemical in Japan and by Ticona in Germany. Cyclic olefin hompopolymers/copolymers are thermoplastics derived from the ring-shaped norborene molecule, which is made from dicyclopentadiene (DCPD) and ethylene. Arton is functionalized by an ester side chain to control Tg. The retarder film layer 100 may further be molecularly aligned, which may give the material anisotropic properties.

Modified polyolefin retarder films provide many of the salient features necessary for a high performance compensating retarder film 100. However, the retardance of these retarder films can exhibit poor photostability when exposed to environmental influences, in particular when exposed to oxygen in a high-heat, high-luminance environment. For instance, a retarder film can lose a significant retardance fraction after fewer than 100 hours in a 70° C., 50 Mlux, UV- and infrared-filtered visible illumination environment. The loss in anisotropy is the result of a photochemical interaction, which is clearly most observable in the area of highest illumination (and therefore thermal conditions play a relatively small role). When mounted conventionally, resulting components can quickly degrade, making them unsuitable for projection. It can be further observed through reliability testing that the rate of failure is largely a function of the ambient conditions. That is, the rate of retardance loss can be significantly reduced by exposing the film to a nitrogen-rich environment (as opposed to an oxygen-rich environment). This indicates that oxygen serves as a catalyst for the breakdown of the polymer chain.

The optical component described provides several compensation functions, including: (1) eliminating in-plane retardance of the panel in the dark state; (2) eliminating z-retardance of the panel for improved contrast at low f-number; and (3) eliminating light leakage due to geometrical rotations from McNeille PBSs, for improved contrast at low f-number. Other optical characteristics may be of interest in other contexts, however, and optical components made for other contexts but still according to the embodiments claimed in this application will still be covered by the claims that ultimately issue from this application.

Retarder films formed from relatively rigid materials, such as the Arton® product, tend to be positive uniaxial with optic axis along the stretching direction. LCoS panels tend to require small in-plane retardance corrections to achieve high contrast (typically 10-25 nm). The small in-plane compensator can be crossed with the panel retarder to nullify the net in-plane retardation, increasing contrast. However, low retardance values are often difficult to control in manufacturing, making it difficult to yield material with acceptable uniformity of optic axis and retardance. Thus, low retardance films manufactured using casting or extrusion only, or through very mild stretching, generally show poor uniformity.

There are two methods to overcome this, both of which additionally provide the field-of-view compensation that is also beneficial. A first method is to significantly stretch two retarder films and weld them together. A second method is to stretch a single retarder film along two axes.

Crossed Uniaxial Plates

In the first approach, two retardance values are fabricated by crossed positive uniaxial retarder films. The difference between their retardance values should typically closely match the residual retardance of the panel in the dark state. Depending upon the LC mode, this residual retardance can be, for example, 3 nm to 25 nm. When compensating the in-plane retardance of a panel, it is crucial that the retardance stability be well matched, such that the net retardance approaches zero, and contrast is maximized. The mean contrast is dictated by the average retardance difference, such that the contrast uniformity is dictated by the spatial uniformity of the panel and compensator. Typically, the compensator must maintain a uniformity of <±0.5 nm over the entire clear aperture, over the full range of temperature operation, and under intense illumination. In addition, the retardance of each film is roughly matched to the z-retardance of the panel in the dark state for optimal field-of-view compensation. This retardance value is usually large enough (e.g. 140-250 nm) that tight tolerances on retardance and optic axis can be maintained in manufacturing. When properly oriented, the pair can compensate for the in-plane retardance, while also accomplishing some field-of-view compensation. In the particular case of vertically aligned nematic (VAN) mode panels, the retarder films may have nearly matched retardance values, with optic axes oriented at ±45° with respect to input polarization. For certain LC modes, the optimization of in-plane and z-retardance compensation together may additionally require three or more retarder films.

Embodiments of the compensator can be made by laminating a pair of low-elasticity retarder films together before glass mounting. Laminating may be accomplished by any method, such as but not limited to, using a sealant with adhesive properties, or preferably by solvent bonding as described in U.S. Pat. No. 6,638,583, which is incorporated by reference herein. In this embodiment, a retarder film layer comprising, for example, an Arton® film pair laminated using a solvent such as MAK (methyl amyl ketone), shows extremely good peel strength (in many instances, the film will break before separating) combined with very low birefringence relaxation, e.g., approximately 1-2% birefringence relaxation. For embodiments using adhesives, a monomer can be included in the adhesive in order to enhance the monomer's adhesive properties.

Without wishing to be held to any particular theory, the applicants believe that the relative insensitivity of the retarder film pair to the mechanical stress of lamination of a low-elasticity organic layer results in superior uniformity, relative to polycarbonate-based laminates processed identically.

The low-elasticity retarder film pair shows advantages over polycarbonate-based laminates, as the polycarbonate-based laminates can show relatively high optic axis wander as a result of the lamination process. This is evident when several sheets are laminated with optic axis along a common direction and then observed in crossed polarizers. Optic axis wander causes different regions to be extinguished at different orientations, or for regions to be poorly extinguished in any orientation. Retarder film layers that comprise a relatively rigid polymers having low elasticity according to the disclosed principles, however, suffer little or no performance loss, such as optic axis wander, during solvent bonding.

Retarder-film-pairs solvent-bonded in this manner show low birefringence texture, having the appearance of a uniform single-layer retarder film when viewed at normal incidence between crossed polarizers. Solvent bonding additionally has the benefit of preserving transmitted wavefront (due to zero bondline thickness), is inexpensive, and achieves strong bonds on a short timescale. The resulting laminated solvent pair contains substantially no foreign material, shows substantially diminished internal optical interfaces or reflections, and satisfactorily reduces coefficient of thermal expansion mismatch or sealant failure issues.

Figure 4:
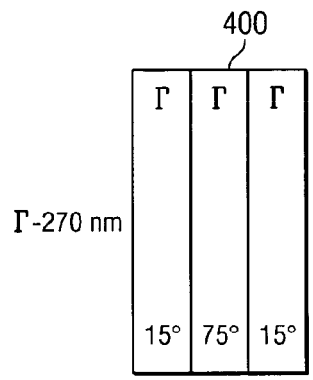
FIG. 4 illustrates one embodiment of a multi-layer retarder film constructed according to the disclosed principles.

By laminating additional layers to make a multi-layer compensator (see FIG. 4), additional functionality can be achieved. Several layers may be used to compensate the overall system, including panel and PBS. Multi-layer laminates 400 can be produced by repetitive application of the process described above as necessary.

In addition, laminates manufactured as described above, are subsequently mounted between glass substrates using an optically clear sealant. In some embodiments, the compensating component is fabricated by pressing the two glass or ceramic substrates layers together with the retarder film layer positioned therebetween. The layers are held together using a suitable adhesive that preferably also acts an oxygen barrier. The sealant is either UV or thermally cured. The sealant, when cross-linked, hermetically seals the retarder film layer from the environment. In particular the film is isolated from oxygen that otherwise serves as a catalyst to accelerate relaxation in retardance. Parts can be sliced and diced from the mother sheet and, if necessary, edge-sealed to improve the environmental resistance.

Single Biaxially Stretched Plate

Another manufacturing technique for achieving the desired in-plane and z-retardance in accordance with the principles disclosed herein is to use biaxial stretching. Accordingly, a low elasticity polymer film is first stretched in the web direction (increasing refractive index) to achieve a retardance value roughly matched to that of the panel. The subsequent stretching in the plane of the film, but perpendicular to the web direction, results in a film with substantially higher refractive index in the plane of the film relative to the normal direction. This results in the combination of c-plate retardance with a desired in-plane retardance. One feature of this embodiment is that a single layer can have the desired biaxiality to compensate both in-plane and for field of view.

For achieving lamination of the biaxially stretched film or plate to any other material, the lamination techniques discussed above for the crossed uniaxial plate embodiment can be used where appropriate.

Using either of the above means, the in-plane retardation value can be controlled. Depending upon the LC mode, LCoS panels can have various in-plane compensation values to maximize contrast (e.g. 3-25 nm). In HTPS panels, either a twisted nematic (TN) or vertically aligned nematic (VAN) mode is possible. For TN panels, contrast improvement often involves compensation of oblique molecular distribution near the boundaries. However, the off-state of a VAN HTPS panel is determined by the undriven state. Thus, a more uniform molecular distribution exists, substantially along the normal-incidence direction. This amounts to a small in-plane retardance (e.g. at ±45°), coupled with a relatively large z-retardance. Such a compensation function is conveniently provided by component manufactured according to the present invention.

Skew Ray Compensation

Another application of the principles disclosed herein is the construction of a skew ray compensator. Quarter-wave retarders are used to correct geometrical distortion of skew-rays introduced to LCoS panels by McNeille PBS cubes. For proper function, the quarter-wave retarder must have zero effect at normal incidence, or in the p-plane. Any spatial instability of the optic axis of the quarter-wave retarder will rapidly degrade the contrast according to equation (1):

$$CR = 1/\sin^2[2\alpha] \quad \text{(Equation 1)}$$

where $\alpha$ is the local optic axis orientation. According to this embodiment, mounted low elasticity quarter-wave retarders should preserve optic axis stability to <±0.2° throughout the range of operating conditions. As for the skew rays that are transformed by the retarder, proper correction requires that the state of polarization (SOP) be efficiently reflected about the fast axis (i.e., maps a linear state to a linear state). This requires that the single-pass retardance is very nearly a quarter-wave over the entire band for which it operates. In a three-panel system, this is typically 430-480 nm (blue), 520-570 nm (green), and 590-650 nm (red). Though important, the retardance stability is of lesser concern than the optic axis stability for insuring high system contrast. Accordingly, a low elasticity retarder film layer is very beneficial in providing a robust solution. The fabrication of the sandwich configuration that provides reliable performance may be as described above.

Other Applications

Compound multi-layer elements, which can form achromatic circular polarizers, achromatic polarization rotators, achromatic half-wave and achromatic quarter-wave retarders, have the potential to perform extremely well over a very broad wavelength range (up to 400-2000 nm is possible in a single stack). In practice, small deviations in optic axis and retardance of each film that develop during lamination can severely degrade performance. The achromatic response requires that all wavelengths map to the same end point on the Poincare sphere after multiple polarization transformations. For a retarder, optic axis stability further requires that all wavelengths map to the input polarization when light is introduced along the compound optic axis. The sensitivity of these requirements is considerable, and there is little margin for error due to the lamination process. Using highly rigid substrate materials, chemical-bonding processes can be carried out with very little degradation in performance. Relative to polycarbonate-based achromatic elements, the gap between theoretical and measured performance is very nearly predicted by the as-stretched properties of the base film.

Figure 2:
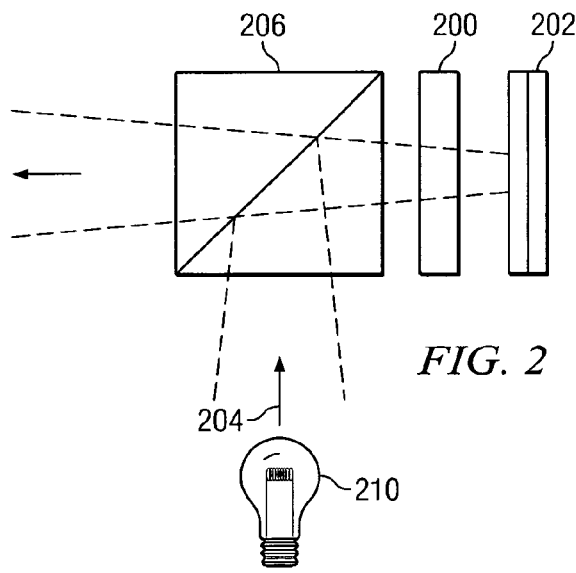
FIG. 2 illustrates one embodiment of a portion of an LCoS display system that may provide an environment for a compensator as disclosed herein.
Figure 3:
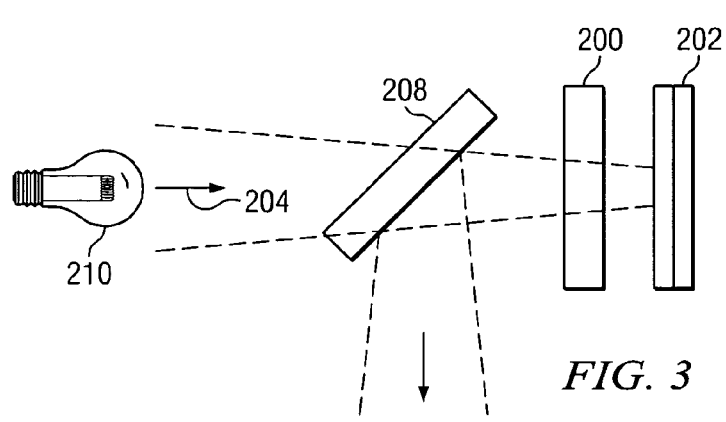
FIG. 3 illustrates another embodiment of a portion of an LCoS display system that may incorporate a compensator of the type disclosed herein.

Regardless of the process described above for constructing the compensator, FIGS. 2 and 3 illustrate exemplary embodiments of LCoS display systems that incorporate compensators constructed as disclosed herein. In both illustrated systems, a compensator 200 is shown placed proximate an LCoS panel 202 to compensate light 204 illuminated on the panel 202 and reflected therefrom; the light is generated by a light source 210. More specifically, FIG. 2 illustrates an LCoS display system employing a McNeille PBS 206, while FIG. 3 illustrates a disclosed compensator to reduce polarization distortion induced by a wire-grid polarizer 208.

While various embodiments constructed according to the principles disclosed herein, have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components and operations are illustrated in the context of specific configurations. Other allocations of functionality are envisioned and will fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

The compensating stacks described herein may be made from any suitable material such as solid crystals, stretched polymers, liquid crystal polymers, or another material. The liquid crystal polymer can have dual homogeneous alignment, splay alignment (homogeneous/homeotropic) or any suitable alignment. Although the compensated retarder stacks are discussed in the context of color management for projection display, they can be used in a number of applications. These include, among others, color separation for image capture or radiometry, lighting, and near infrared optical communications.

Although several embodiments of; the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. An optical projection system having a projection light path and comprising:
   a light source for providing a projection light, the light source being positioned at the beginning of the projection light path;
   a projection lens positioned at the ending of the projection light path; and
   a compensating optical component positioned in the projection light path, the compensating optical component being exposed to high-intensity light at its position in the projection light path, wherein the compensating optical component comprises:
      a retarder film characterized by a retardance, the retarder film being susceptible to undergoing a photochemical reaction when exposed to the high-intensity light, wherein the photochemical reaction would alter the retardance of the retarder film; and
      a sealing element at least partially surrounding the retarder film, whereby the sealing element, by itself or with another element, is operable to provide a hermetic seal that encloses the retarder film and substantially limits the photochemical reaction that would have otherwise altered the retardance of the retarder film.

2. The projection system according to claim 1 wherein the compensation optical component further comprises a substrate layer adjacent to the retarder film and wherein the sealing element is operable to substantially seal the retarder film against the substrate layer.

3. The projection system according to claim 2, wherein the substrate layer is selected from the group consisting of fused silica, boro-float glass, ceramic glass, and optically clear glass.

4. The projection system according to claim 2, wherein the substrate is a low birefringence polymer.

5. The projection system according to claim 2, wherein the substrate is an aligned polymer substrate having a stretching direction that is aligned with or orthogonal to the polarization direction of an input light.

6. The projection system according to claim 2, wherein the compensating optical component further comprises an additional barrier layer formed upon the substrate, wherein the additional barrier layer is operable to perform at least one additional function selected from the group consisting of: providing additional sealing against the environment surrounding the compensating optical component, stiffening the substrate, making the substrate less reflective to incident light, and improving the optical characteristics of light passing through the compensating optical component.

7. The projection system according to claim 2, wherein the compensating optical component further comprises an additional barrier layer and wherein the additional barrier layer is further operable to perform at least one additional function selected from the group consisting of: acting as the sealing element of claim 1, providing additional sealing against the environment surrounding the compensating optical component, stiffening the compensating optical component, making the substrate less reflective to incident light, and improving the optical characteristics of light passing through the compensating optical component.

8. The projection system according to claim 1 wherein the compensating-optical component further comprises first and second substrate layers adjacent to the retarder film and on opposite sides of the retarder film and wherein the sealing element is operable to substantially seal the retarder film between the first and second substrate layers, whereby the sealing element and the first and second substrate layers substantially enclose and seal the retarder film.

9. The projection system according to claim 1, wherein the retarder film layer comprises a single layer.

10. The projection system according to claim 1, wherein the retarder film comprises a modified polyolefin film.

11. The projection system according to claim 1, wherein the retarder film is biaxially stretched.

12. The projection system according to claim 1, wherein the retarder film comprises two or more layers.

13. The projection system according to claim 12, wherein the retarder film comprises a pair of crossed uniaxial molecularly aligned layers.

14. The projection system according to claim 11, wherein the sealing element is a barrier layer of a material selected from the group consisting of optically clear sealants, acrylic sealants, and ultraviolet cured acrylic sealants.

15. The projection system according to claim 1, wherein the sealing element comprises additional retarder films that are welded to the retarder film.

16. The projection system according to claim 15, wherein the additional retarder films have no polarization function and wherein the retarder film has a polarization control function.

17. The projection system according to claim 16, wherein the polarization control function of the retarder film is selected from the group consisting of: polarization rotation, polarization retardation, and wavelength-selective polarization rotation and/or retardation.

18. The projection system according to claim 1, wherein the sealing element is a barrier layer formed on the retarder film.

19. The projection system according to claim 1, wherein the barrier layer is formed by wet/vacuum coating.

20. The projection system according to claim 1, wherein the compensating optical component further comprises an antireflective coating formed outside the retarder film.

21. The projection system according to claim 1, wherein the sealing element further functions as an antireflective coating.

22. The projection system according to claim 1, wherein the sealing element comprises an adhesive that is formed at least partially over the retarder film.

23. The projection system according to claim 22, wherein the adhesive comprises a monomer.

24. The projection system according to claim 1, wherein the compensating optical component has an optic axis stability of < ±0.1° and retardance stability of < ±0.5 nm in a 50 Mlux environment over at least 3000 hours.

25. An optical projection system having a projection light path and comprising:
    a light source for providing a projection light, the light source being positioned at the beginning of the projection light path;
    a projection lens positioned at the ending of the projection light path; and
    a compensating optical component positioned in the projection light path, the compensating optical component being exposed to high-intensity light at its position in the projection light path, wherein the compensating optical component comprises:
        a retarder film characterized by a retardance, the retarder film being susceptible to undergoing a photochemical reaction when exposed to the high-intensity light, wherein the photochemical reaction would alter the retardance of the retarder film;
        first and second substrate layers adjacent to the retarder film and on opposite sides of the retarder film; and
        a sealing element connected to the first and second substrate layers, wherein the sealing element is an edge substantially sealing the first and second substrate layers together, whereby the edge seal and the first and second substrate layers are operable to provide a hermetic seal that encloses the retarder film and substantially limits the photochemical reaction that would have otherwise altered the retardance of the retarder film.

* * * * *